United States Patent [19]

Peterson

[11] Patent Number: 5,522,766

[45] Date of Patent: Jun. 4, 1996

[54] VACUUM ACTUATED DOOR

[75] Inventor: Francis C. Peterson, Prescott, Wis.

[73] Assignee: Phillips Plastics Corporation, Prescott, Wis.

[21] Appl. No.: 381,003

[22] Filed: Jan. 25, 1995

Related U.S. Application Data

[63] Continuation of Ser. No. 946,954, Sep. 17, 1992, abandoned.

[51] Int. Cl.$^6$ ..................................... B60H 1/24
[52] U.S. Cl. ..................... 454/69; 251/61.1; 454/139
[58] Field of Search ................... 454/69, 139; 251/61.1, 251/298; 137/875

[56] References Cited

U.S. PATENT DOCUMENTS 4,555,945 12/1985 Hanson .
4,614,152 9/1986 Fukasaku et al. ..................... 454/139
4,765,675 8/1988 Svensson .
4,903,854 2/1990 Schiemann .

FOREIGN PATENT DOCUMENTS 99711 6/1985 Japan ..................................... 454/139

OTHER PUBLICATIONS

Dupont's Hytrel, the Automotive Flexdamper, developed by Enerzone Automotive, Dallas, Texas; Design Guidelines for Automotive Flexvalves, pp. 1–13.

Primary Examiner—Harold Joyce
Attorney, Agent, or Firm—Merchant, Gould, Smith, Edell, Welter & Schmidt

[57] ABSTRACT

A ventilation control door is integrated with a reservoir chamber. The air pressure within the reservoir chamber controls the position of the door to regulate ventilation. As the volume of the reservoir diminishes the door moves in a preferred direction. A restoring spring within the reservoir returns the door to a nominal position.

9 Claims, 4 Drawing Sheets

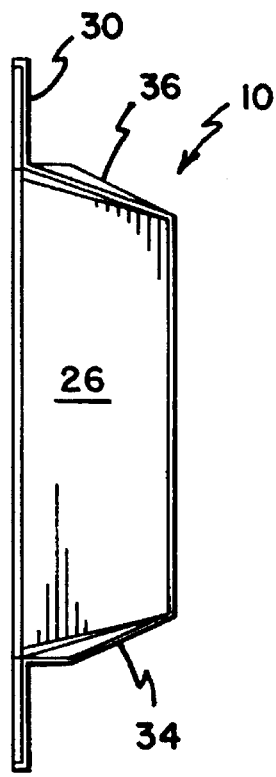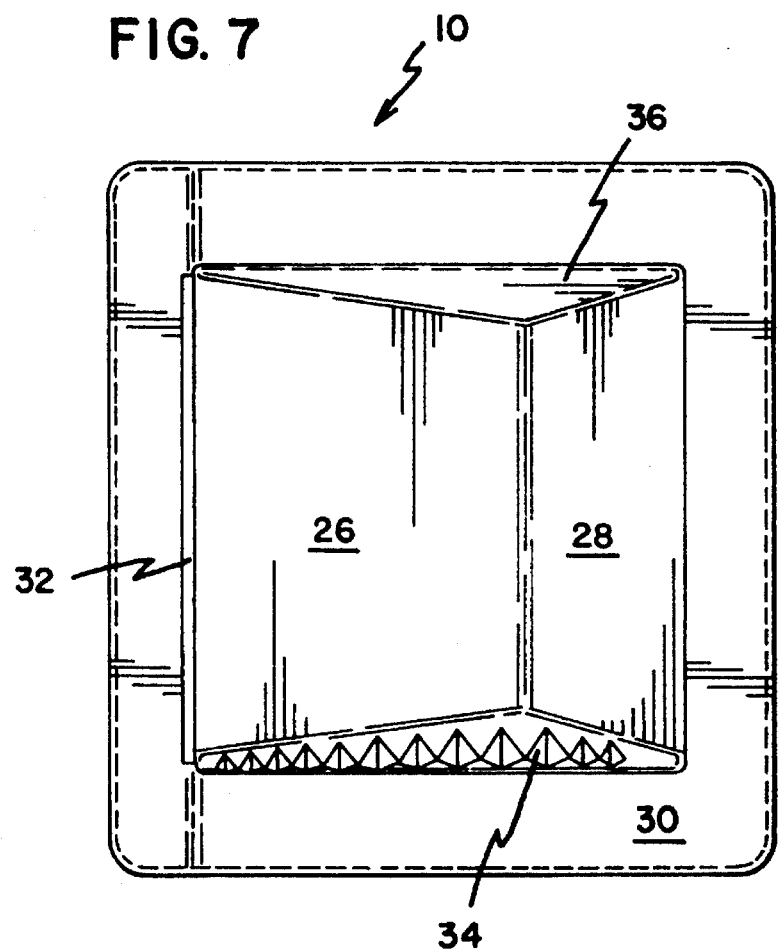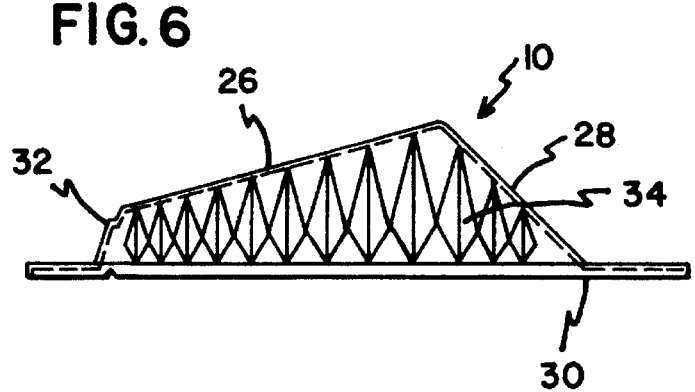

VACUUM ACTUATED DOOR

This is a Continuation of patent application Ser. No. 07/946,954, filed Sep. 17, 1992, abandoned.

TECHNICAL FIELD

The invention relates to air flow control structures used for heating and cooling systems, and more particularly to a vacuum operated structures for use in automotive ventilation application.

1. Background Art

Modern automobiles have complex ventilation systems associated with air-conditioning and heating units. Typically, air flow is controlled by a rotatable door located within the automotive air flow duct system. The door may be mounted for rotation on an axle that spans the duct. Usually the door is rotated by a vacuum actuator located outside the duct work. The vacuum actuator may be coupled to a lever linkage attached to the axle. More recently, it has been proposed to integrate a bellows type actuator with the door structure. However, such devices are bulky and prone to failure.

2. Summary Disclosure

According to the invention several panels 26,28,30 32 are hinged to each other and they collectively form a polygonal linkage. These panels are coupled to a first side wall 34 and a second side wall 36. Together, all of these elements define a reservoir 22. The volume within this reservoir is variable and depends upon the various angles between the various panels which make up the reservoir. A vacuum drawn in the reservoir causes ambient air pressure to diminish the interior volume of the reservoir 22 by movement of the linkage. One panel 30 of the linkage forms a portion of a door assembly 10. One mounting panel 50 is attached to the vehicle duct work. Consequently the application of vacuum to the reservoir 22 causes the door assembly 10 to move from a first position to a second position. The asymmetrical shape of the polygonal linkage causes the linkage to move in a preferred direction. The integration of the polygonal linkage into the door structure provides a compact space efficient assembly which has a long service life and which may be readily designed into an automotive ventilation system.

BRIEF DESCRIPTION OF THE DRAWINGS

An illustrative and exemplary embodiment of the invention is shown in the various figures. Identical reference numerals refer to identical structure throughout.

FIG. 5 is a front view of the door assembly in isolation.

FIG. 6 is a side view of the door assembly in isolation.

FIG. 7 is a front view of the door assembly in isolation.

MODE FOR CARRYING OUT THE INVENTION

Figure 1:
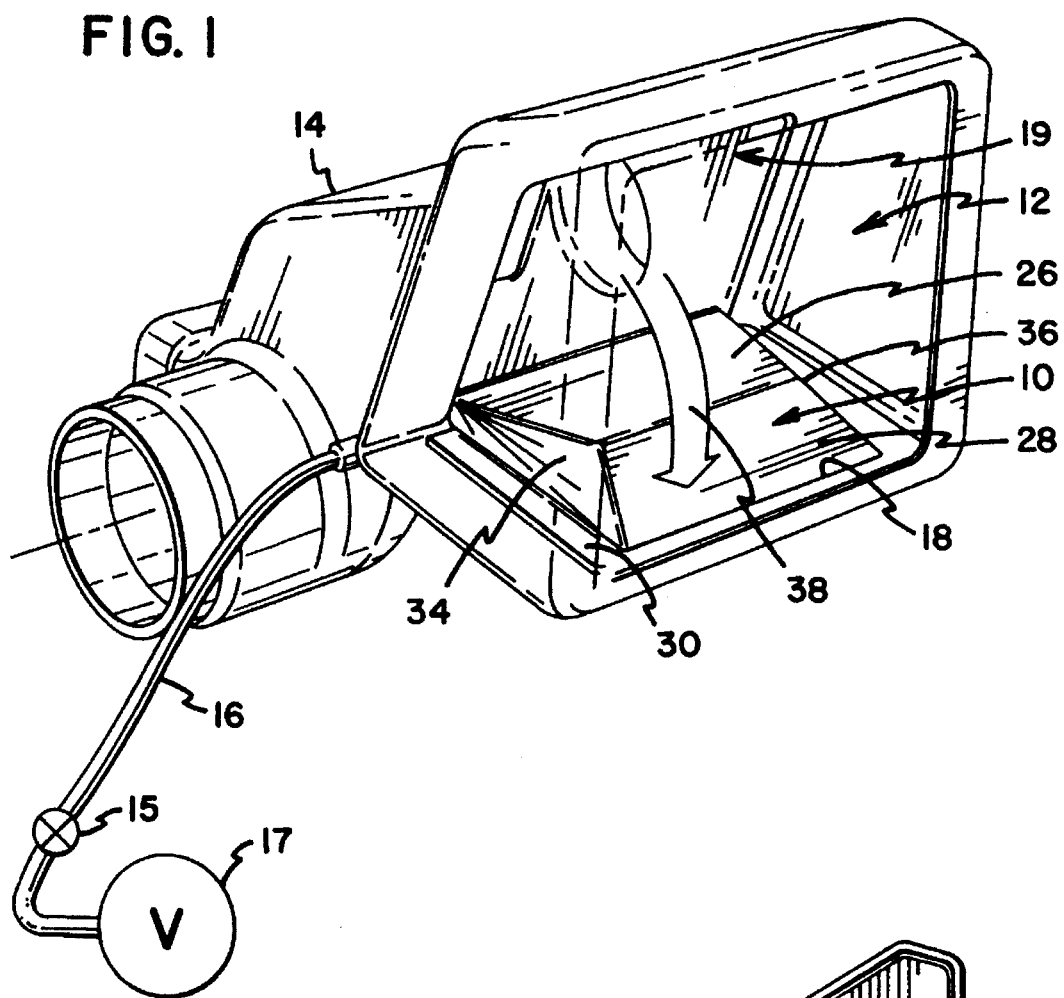
FIG. 1 is a perspective view of the door assembly.

FIG. 1 shows the door assembly 10 located in a plenum 12 of an automotive ventilation duct 14. In FIG. 1 the door assembly 10 is in the actuated state which defines a "first position". In this position subatmospheric pressure is present in the interior of the door assembly. Pressure in the interior of the door assembly is controlled by a remote source 17 which is connected to the door assembly through a vacuum line 16 and a control valve 15.

Figure 2:
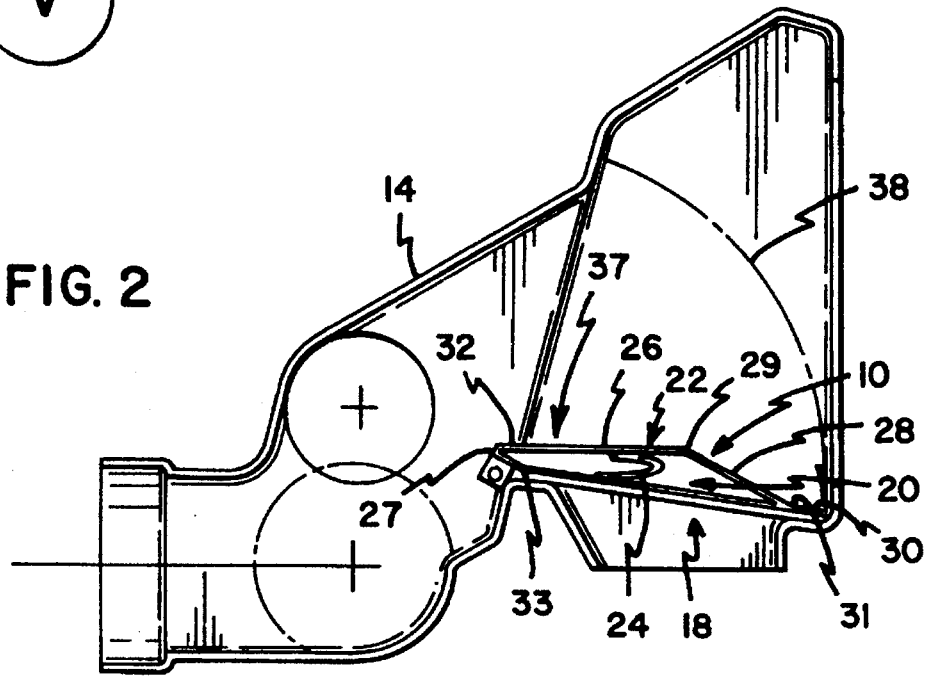
FIG. 2 is a cross-section of the door assembly.

The door assembly 10 is composed of several panels in this embodiment, shown as panel 26, panel 28, panel 30, and panel 32, as seen best in FIG. 2. Pleated bellows structures are used for side wall 34 and side wall 36. Together, the panels and the side walls define the reservoir 22.

FIG. 2 shows the door assembly 10 in the actuated position where the door assembly 10 blocks off an opening 18 in the ventilation duct 14. In this cross-section view the interior 20 of the reservoir 22 is seen in the minimum volume configuration. The subatmospheric pressure within the reservoir 22 causes the return spring 24 to be compressed between panel 26 and panel 30, as the door assembly 10 rotates in the clockwise sense as indicated by arrow 38. This is the maximum energy state for the door assembly 10.

Figure 3:
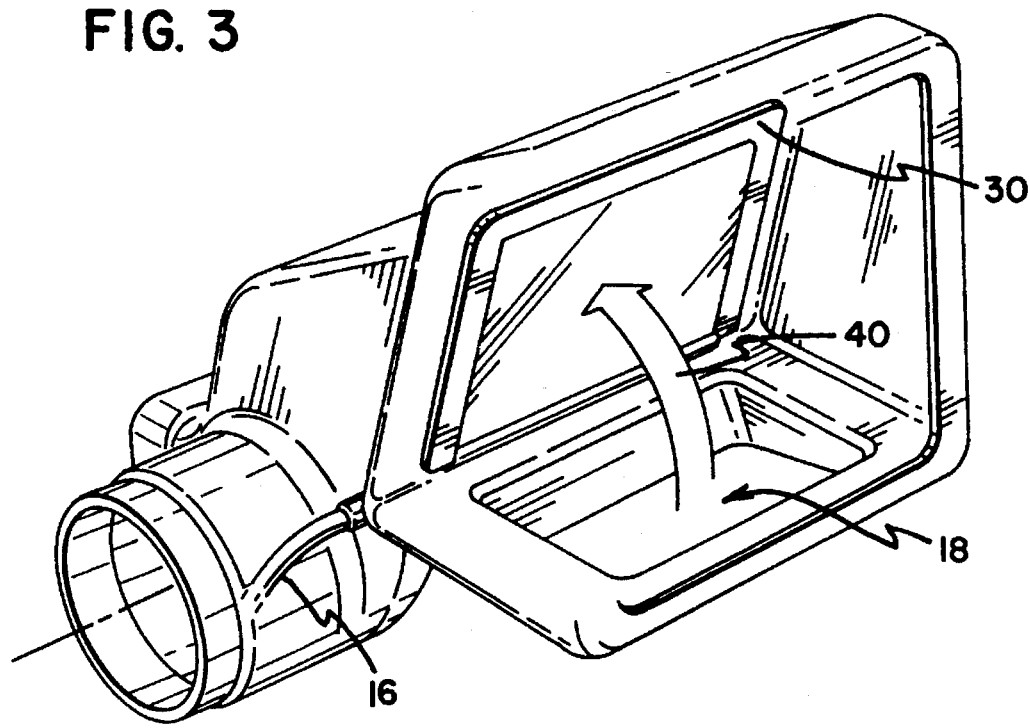
FIG. 3 is a perspective view of the door assembly.

FIG. 3 shows the door assembly rotated into the relaxed state which defines a "second position". Motion in the counterclockwise direction is indicated by arrow 40. This motion occurs when near atmospheric pressure is admitted to the reservoir 22 through the vacuum line 16.

Figure 4:
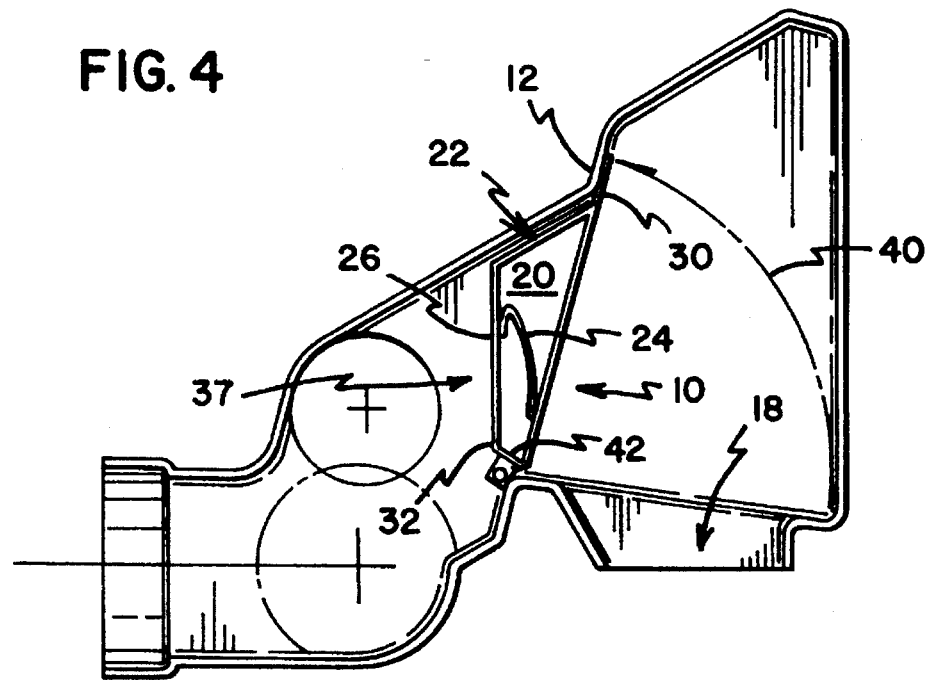
FIG. 4 is a cross-section of the door assembly.

FIG. 4 shows the door assembly 10 in the second position. In this instance the return spring 24 supplies force between panel 30 and panel 26. In this minimum energy state the volume of the interior 20 of the reservoir 22 is at its maximum. In this second position a portion of panel 30 in abutment with the plenum 12. This position blocks off opening 44. One should note that this plenum wall limits continued motion in the counterclockwise direction. This figure also shows the base panel 32 most clearly and shows the aperture 42 which connects the vacuum line 16 with the interior 20 of the reservoir 22.

Comparison of the area confined between the panels in FIG. 2 to the area shown in FIG. 4 reveals that the interior 20 volume tends to increase as the door assembly 10 rotates in the counterclockwise direction. Assuming that the door assembly is in the minimum energy state and the panel dimensions and angles have been selected so that the reduction in reservoir volume from displacement in the clockwise direction exceeds reduction in reservoir volume from displacement in the counterclockwise direction then the panel will prefer to rotate in the direction resulting in the greatest reduction of volume. By selecting asymmetrical panel dimensions to achieve this volume change effect the door assembly 10 can be biased to prefer rotation in the clockwise direction upon the application of subatmospheric pressure.

FIG. 5, FIG. 6 and FIG. 7 should be considered together. These drawings depict the door assembly 10 in isolation and show a form of construction which uses a number of "living hinges" on a unitary molded part to form the panels and side walls.

Figure 8:
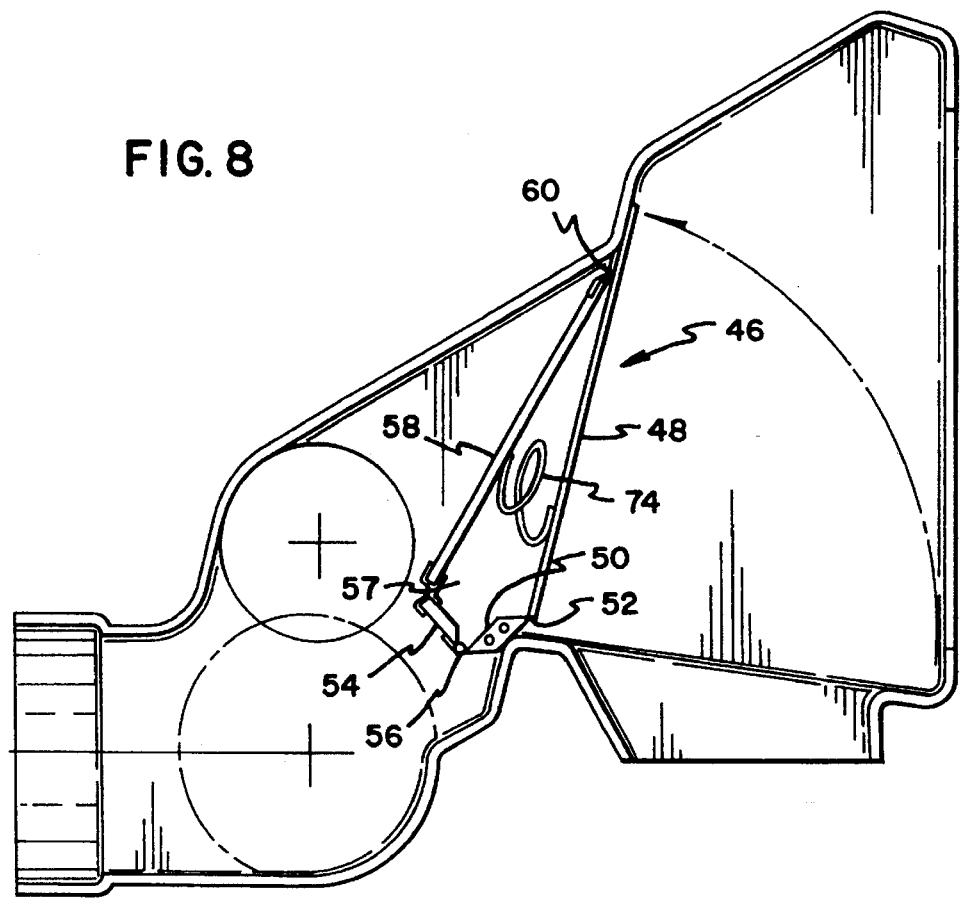
FIG. 8 is a side view of an alternate door construction.

FIG. 8 depicts an alternate and preferred form of door assembly 46 construction. In this embodiment the first door panel 48 is connected to a second mounting panel 50 by an elastomeric hinge 52. The third base panel 54 is likewise hinged to the second mounting panel 50 with an elastomeric hinge 56. The fourth actuator panel 58 is hinged via elastomeric hinge 60 to first door panel 48 and hinged via elastomeric hinge 57 to the third base panel 54. It is desirable to supply a coil type restoring spring 24, between actuator panel 56 and door panel 48.

The relatively rigid panels along with the elastomeric hinges provides a structure which is capable of moving the first door panel 48 through approximately ninety degrees of rotation.

Figure 9:
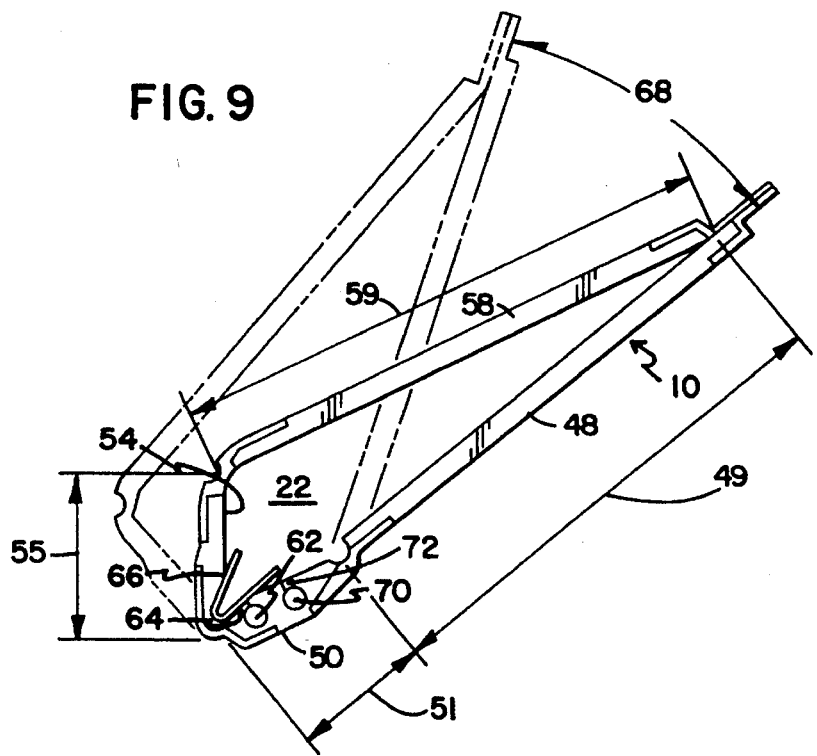
FIG. 9 is a detail side view of an alternate door assembly.

FIG. 9 is a detail side view of an alternate door assembly which can be positioned in an "intermediate" position between the first position and the second position. In this embodiment two air passages are provided. The first passage 62 is connected to a first orifice 64 which communicates with the reservoir 22. A small leaf type valve spring 66 is attached to the base panel 54 and moves into abutment with the first orifice 64 as the door assembly moves through arc 68. When a vacuum is drawn at first air passage 62 the door assembly 10 will rotate through the arc 68 until the first orifice 64 is covered by the leaf type valve spring 66. Any leakage will cause the orifice to become uncovered thus repositioning the door in the intermediate position. If full motion is desired, vacuum can be applied to the second air passage 70. The second orifice 72 which communicates to the reservoir 22 from second air passage 70 is not obstructed by the valve spring 66 and therefore permits the full range of door motion into the second position. The light restoring force supplied by the valve spring 66 does not prevent this motion.

As seen in FIG. 9 the various panels have varying effective lengths. The length of the base panel 50 is shown by arrow 51. The length of actuator panel 58 is shown by arrow 59. The length of base panel 54 is shown as 55 in the drawing. Since the length 55 of the base panel 54 exceeds the length 51 of the mounting panel 50 the arcuate path 68 may swing through an angle larger than the approximately 90 degree rotation shown in connection with FIG. 8. In many applications it will be desirable to have the length of the base panel exceed the length of the mounting panel. The characteristic length of each panel is measured between the companion hinge points. It should be apparent that the panels may overhang the hinge locations in some applications. It should be understood that the term base panel and mounting panel are for the purposes of defining the context of the invention in connection with the exemplary duct 14 shown in the drawing and should not be considered otherwise limiting.

What is claimed is:

1. A door assembly (46) for controlling airflow through a ventilation duct (14) comprising:

a door panel (48) having a first hinge (52), said door panel (48) being movable from a first position to a second position by rotation of said door panel (48) about the axis of said first hinge (52);

a mounting panel (50) connected to said first hinge (52) and having a fourth hinge (56) attached to said mounting panel, said fourth hinge having an axis which is parallel to said first hinge (52), said mounting panel being adapted to mount to said ventilation duct (14);

a base panel (54) connected to said fourth hinge (56) and having a third hinge (57) having an axis parallel to the axis of said first hinge (52);

an actuator panel (58) connected to said base panel (54) through said third hinge (57), and connected to said door panel (48) through a second hinge (60);

said door panel (48), said mounting panel (50); said base panel (54); said actuator panel (58) together with a first side wall (34) and a second side wall (36) together forming a reservoir;

said reservoir having a nominal volume;

whereby motion of said door panel (48) toward said first position results in reduction of volume of said reservoir, and motion toward said second position results in increasing the volume of said reservoir;

whereby the volume of said reservoir controls the position of said door assembly between said first position and said second position.

2. A door assembly for controlling air flow through a ventilation duct comprising:

a door panel movable from a first position within said duct to a second position within said duct;

a reservoir coupled to said door panel;

said reservoir comprising at least three panel segments hinged to permit the reservoir volume to change with the motion of door panel;

a source of air pressure coupled to said reservoir controlling the volume of said reservoir;

whereby the volume of said reservoir controls the position of said door panel.

3. A door assembly for controlling air flow through a ventilation duct comprising:

a door panel (48);

a mounting panel (50) coupled to said door panel (48) by a hinge (56);

a base panel (54) coupled to said mounting panel (50) by a hinge (56);

an actuator panel (58 coupled to said base panel (54) by a hinge (56), and coupled to said door panel (48) by a hinge (60);

whereby said panels and hinges collectively form a polygonal linkage for moving said door panel (48) in an arcuate path (68);

whereby said panels and hinges together form a portion of a reservoir;

said reservoir having an interior volume which increases in response to door motion in a first direction and which decreases in response to door motion in a second direction;

pressure control means for controlling air flow into and out of said reservoir to control the position of said door panel.

4. The apparatus of claim 3 wherein said pressure control means comprises:

a first air passage (62) communicating with said reservoir (22);

a second air passage (70) communicating with said reservoir (22);

a valve spring (66) connected to said base panel (54); whereby said valve spring (66) may prevent said second air passage from communicating with said reservoir (22) at a predetermined door panel position.

5. A door assembly for controlling air flow through a ventilation duct comprising:

a door panel (48) having a characteristic door panel length (49);

a mounting panel (50) coupled to said door panel (48) by a hinge (56), said mounting panel having a characteristic mounting panel length (51);

a base panel (54) coupled to said mounting panel (50) by a hinge (56), said base panel having a characteristic base panel length (55);

an actuator panel (58) coupled to said base panel (54) by a hinge (56), and coupled to said door panel (48) by a hinge (60), said actuator panel having a characteristic actuator panel length (59);

whereby said panels and hinges collectively form a linkage for moving said door panel (48) in an arcuate path (68) through an actuation angle;

whereby said panels and hinges together form a portion of a reservoir;

said reservoir having an interior volume which varies as a function of motion along said arcuate path (68);

wherein said characteristic base panel length (54) is greater than the characteristic mounting panel length (51).

6. A door assembly for controlling air flow through a ventilation duct comprising:

a door panel (48) having a characteristic door panel length (49);

a mounting panel (50) coupled to said door panel (48) by a hinge (56), said mounting panel having a characteristic mounting panel length (51);

a base panel (54) coupled to said mounting panel (50) by a hinge (56), said base panel having a characteristic base panel length (55);

an actuator panel (58) coupled to said base panel (54) by a hinge (56), and coupled to said door panel (48) by a hinge (60), said actuator panel having a characteristic actuator panel length (59);

whereby said panels and hinges collectively form a linkage for moving said door panel (48) in an arcuate path (68) through an actuation angle;

whereby said panels and hinges together form a portion of a reservoir;

said reservoir having an interior volume which varies as a function of motion along said arcuate path (68);

wherein said characteristic base panel length (54) is greater than said characteristic mounting panel length (51) such that said door panel can move along an arcuate path (68) greater than ninety degrees.

7. A door assembly for controlling air flow through a ventilation duct comprising:

a door panel (48) having a characteristic door panel length (49);

a mounting panel (50) coupled to said door panel (48) by a hinge (56), said mounting panel having a characteristic mounting panel length (51);

a base panel (54) coupled to said mounting panel (50) by a hinge (56), said base panel having a characteristic base panel length (55);

an actuator panel (58) coupled to said base panel (54) by a hinge (56), and coupled to said door panel (48) by a hinge (60), said actuator panel having a characteristic actuator panel length (59);

whereby said panels and hinges collectively form a linkage for moving said door panel (48) in an arcuate path (68) through an actuation angle;

whereby said panels and hinges together form a portion of a reservoir;

said reservoir having an interior volume which varies as a function of motion along said arcuate path (68);

wherein said characteristic base panel length (54) is substantially equal to said characteristic mounting panel length (51).

8. The apparatus of claim 6 wherein the characteristic door panel length (49) is less than the characteristic actuator panel length (59).

9. The apparatus of claim 7 wherein the characteristic door panel length (49) is less than the characteristic actuator panel length (59).

* * * * *

UNITED STATES PATENT AND TRADEMARK OFFICE
CERTIFICATE OF CORRECTION

PATENT NO. : 5,522,766

DATED : June 4, 1996

INVENTOR(S) : Francis C. Peterson

It is certified that error appears in the above-identified patent and that said Letters Patent is hereby corrected as shown below:

In column 1, line 10, please delete the word "structures" and insert therefor --structure--

In column 3, line 1, after the word "assembly", please insert the number --10--

In column 4, line 21 (claim 3), please delete "(58", and insert therefor --(58)--

Signed and Sealed this

Fifteenth Day of October, 1996

*Attest:*

BRUCE LEHMAN

*Attesting Officer*     *Commissioner of Patents and Trademarks*